(12) United States Patent
Zhang (10) Patent No.: US 9,191,289 B2
(45) Date of Patent: Nov. 17, 2015

(54) METHOD, DEVICE AND SYSTEM FOR MONITORING INTERNET-OF-THINGS DEVICE REMOTELY

(75) Inventor: Fei Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 96 days.

(21) Appl. No.: 14/232,566

(22) PCT Filed: Sep. 21, 2011

(86) PCT No.: PCT/CN2011/079954
§ 371 (c)(1),
(2), (4) Date: Jan. 13, 2014

(87) PCT Pub. No.: WO2012/151832
PCT Pub. Date: Nov. 15, 2012

(65) Prior Publication Data
US 2014/0330959 A1    Nov. 6, 2014

(30) Foreign Application Priority Data

Jul. 18, 2011    (CN) .......................... 2011 1 0200814

(51) Int. Cl.
*G06F 15/173*    (2006.01)
*G06F 15/177*    (2006.01)
(Continued)

(52) U.S. Cl.
CPC .......... *H04L 43/045* (2013.01); *H04L 12/2803* (2013.01); *H04L 67/025* (2013.01); *H04L 67/125* (2013.01)

(58) Field of Classification Search
CPC .. H04L 67/025; H04L 67/125; H04L 12/2803
USPC ................................. 709/221–224
See application file for complete search history.

(56) References Cited

U.S. PATENT DOCUMENTS

| 2011/0265158 | A1 | 10/2011 | Cha | |
|---|---|---|---|---|
| 2012/0302254 | A1* | 11/2012 | Charbit et al. | 455/456.1 |
| 2014/0337850 | A1* | 11/2014 | Iniguez | 718/102 |

FOREIGN PATENT DOCUMENTS

| CN | 101888399 A | 11/2010 |
|---|---|---|
| CN | 201750439 U | 2/2011 |

(Continued)

OTHER PUBLICATIONS

Boussard, Mathieu et al., Navigating the Web of Things: Visualizing and Interacting with Web-Enabled Objects, Oct. 18, 2010.

(Continued)

*Primary Examiner* — Minh-Chau Nguyen
(74) *Attorney, Agent, or Firm* — Oppedahl Patent Law Firm LLC (57) ABSTRACT

The disclosure discloses a method for monitoring an Internet-of-things device remotely. The method includes that: a User Equipment (UE) acquires an Internet Protocol (IP) address of a required Internet-of-things device from a remote router, and acquires device-detail information of the Internet-of-things device corresponding to the IP address according to the acquired IP address; draws a virtual control panel of the Internet-of-things device according to the acquired device-detail information, and maps keys of the virtual control panel and a control logic of the keys of the virtual control panel; and monitors the Internet-of-things device remotely by operating the virtual control panel. The disclosure further discloses a device and system for monitoring an Internet-of-things device remotely. With the disclosure, it is possible to implement visualized, remote, and smart monitoring of an Internet-of-things device, so that operation by a user at a UE is as simple, clear, and easy as operation of a real Internet-of-things device, thereby reducing difficult in operation greatly.

17 Claims, 2 Drawing Sheets (51) Int. Cl.
*H04L 12/26* (2006.01)
*H04L 29/08* (2006.01)
*H04L 12/28* (2006.01)

(56) References Cited

FOREIGN PATENT DOCUMENTS

| CN | 101990004 A | 3/2011 |
|----|-------------|--------|
| CN | 102073308 A | 5/2011 |
| WO | 2007023414 A2 | 3/2007 |
| WO | 2009092115 A2 | 7/2009 |
| WO | 2011051182 A1 | 5/2011 |

OTHER PUBLICATIONS

Espada, Jordan Pascual et al., Modeling architecture for collaborative virtual objects based on services, Sep. 1, 2011.

Supplementary European Search Report in European application No. 11865241.1, mailed on Dec. 10, 2014.

English Translation of the Written Opinion of the International Search Authority in international application No. PCT/CN2011/079954, mailed on May 3, 2012.

International Search Report in international application No. PCT/CN2011/079954, mailed on May 3, 2012.

* cited by examiner

METHOD, DEVICE AND SYSTEM FOR MONITORING INTERNET-OF-THINGS DEVICE REMOTELY

TECHNICAL FIELD

The disclosure relates to monitoring technology in an Internet of things, and in particular to a method, device and system for monitoring an Internet-of-things device remotely.

BACKGROUND

A function of remote monitoring has become a normal function in the field of computer, and has been applied extensively on computers, which greatly facilitates daily work and life. Smart household appliances/devices manufactured by some household appliance manufacturers now in sale also start to support the function of remote monitoring one after another by providing a remote monitoring instruction interface so as to be called by another device on an internet.

In related art, the function of remote monitoring is also applied between Internet-of-things devices. Remote monitoring of an Internet-of-things device is implemented generally by sending information of a specific instruction to a target smart household device via a simple instruction assembly such as a short message, while an operator is required to master a control logic of the specific instruction. In other words, the operator must master a real device control logic for monitoring the target smart household device remotely. This undoubtedly makes things more difficult for the operator. Furthermore, operation of the whole process may not be visualized like that of a computer, thereby limiting widespread use of the function of remote monitoring. Therefore, there is a need for a visualized technique to monitor an Internet-of-things device remotely which can be operated easily in an Internet of things.

SUMMARY

In view of this, it is desired to provide in the disclosure a method, device and system for monitoring an Internet-of-things device remotely, being capable of visualized, remote, and smart monitoring of an Internet-of-things device, and being easy to operate with reduced difficulty in operation.

To this end, the technical solution of the disclosure is implemented as follows.

The disclosure discloses a method for monitoring an Internet-of-things device remotely, including:

acquiring, by a User Equipment (UE), an Internet Protocol (IP) address of an Internet-of-things device from a remote router, and acquiring, by the UE, device-detail information of the Internet-of-things device corresponding to the IP address according to the acquired IP address;

drawing, by the UE, a virtual control panel of the Internet-of-things device according to the acquired device-detail information, and mapping, by the UE, keys of the virtual control panel and a control logic of the keys of the virtual control panel; and monitoring, by the UE, the Internet-of-things device remotely by operating the virtual control panel.

Furthermore, the acquiring, by a UE, an IP address of an Internet-of-things device from a remote router may include:

sending, by the UE, an instruction to acquire routing table information to the remote router, receiving, by the UE, the routing table information of the remote router returned by the remote router; and parsing out, by the UE, information on the IP address of the Internet-of-things device in a routing table.

Furthermore, the acquiring, by the UE, device-detail information of the Internet-of-things device corresponding to the IP address according to the acquired IP address may include:

sending, by the UE, an instruction to inquire the device-detail information to a Transmission Control Protocol (TCP)/IP communication module of the Internet-of-things device corresponding to the IP address according to the acquired IP address of the Internet-of-things device, so that the TCP/IP communication module parses and extracts the instruction to inquire the device-detail information, and sends the parsed real device instruction to a Central Processing Unit (CPU) of the Internet-of-things device, which CPU then executes the parsed real device instruction; and receiving, by the UE, a result of the execution packed by the TCP/IP communication module and then returned by the TCP/IP communication module via the remote router.

Furthermore, the device-detail information of the Internet-of-things device may include: a device name, information on coordinates of a device control panel, a key control logic, and information on an instruction set.

Furthermore, the monitoring, by the UE, the Internet-of-things device remotely by operating the virtual control panel may include:

performing, by the UE, a key operation of the virtual control panel, and sending, by the UE, instruction information generated by the control logic of the keys of the virtual control panel to a TCP/IP communication module of the Internet-of-things device via the remote router, so that the TCP/IP communication module receives and parses the instruction information, and delivers a real device instruction generated from parsing the instruction information to a CPU of the Internet-of-things device, which CPU then executes an operation corresponding to the real device instruction; and receiving, by the UE, information on a result of the execution sent by the CPU.

The disclosure further discloses a device for monitoring an Internet-of-things device remotely, including a control module and a Transmission Control Protocol (TCP)/Internet Protocol (IP) communication module, wherein the control module includes an IP address retrieving unit, a detail information acquiring unit, a virtual mapping unit and a remote monitoring unit, wherein the IP address retrieving unit is configured to acquire an IP address of a required Internet-of-things device from a remote router;

the detail information acquiring unit is configured to acquire device-detail information of the Internet-of-things device corresponding to the IP address according to the acquired IP address;

the virtual mapping unit is configured to draw a virtual control panel of the Internet-of-things device according to the acquired device-detail information, and map keys of the virtual control panel and a control logic of the keys of the virtual control panel; and the remote monitoring unit is configured to monitor the Internet-of-things device remotely through the drawn virtual control panel; and the TCP/IP communication module is configured to implement interactive communication between a Central Processing Unit (CPU) of the Internet-of-things device and the remote router.

Furthermore, the IP address retrieving unit may be configured to send an instruction to acquire routing table information to the remote router, and receive routing table information returned by the remote router, wherein the routing table information includes information on the IP address of the required Internet-of-things device.

Furthermore, the detail information acquiring unit may be configured to: send an instruction to inquire the device-detail information to the TCP/IP communication module of an Internet-of-things device corresponding to the IP address according to the acquired IP address; and receive a processing result including the device-detail information of the Internet-of-things device returned by the TCP/IP communication module.

Furthermore, the TCP/IP communication module may be configured to: receive and parse control instruction information sent by the control module via the remote router; send a parsed real device instruction to the CPU of the Internet-of-things device for execution; process a result of the execution by the CPU, and return the processed result of the execution to the remote router.

The disclosure further discloses a system for monitoring an Internet-of-things device remotely, including a User Equipment (UE), a remote router and an Internet-of-things device, wherein the UE includes a control module, wherein the control module includes an Internet Protocol (IP) address retrieving unit, a detail information acquiring unit, a virtual mapping unit and a remote monitoring unit, wherein the IP address retrieving unit is configured to acquire an IP address of a required Internet-of-things device from the remote router;

the detail information acquiring unit is configured to acquire device-detail information of the Internet-of-things device corresponding to the IP address according to the acquired IP address;

the virtual mapping unit is configured to draw a virtual control panel of the Internet-of-things device according to the acquired device-detail information, and map keys of the virtual control panel and a control logic of the keys of the virtual control panel; and the remote monitoring unit is configured to monitor the Internet-of-things device remotely through the drawn virtual control panel; and the Internet-of-things device includes a Transmission Control Protocol (TCP)/IP communication module configured to implement interactive communication between a Central Processing Unit (CPU) of the Internet-of-things device and the remote router.

Furthermore, the IP address retrieving unit may be configured to send an instruction to acquire routing table information to the remote router, and receive routing table information returned by the remote router, wherein the routing table information includes information on the IP address of the required Internet-of-things device.

Furthermore, the detail information acquiring unit may be configured to: send an instruction to inquire the device-detail information to the TCP/IP communication module of an Internet-of-things device corresponding to the IP address according to the acquired IP address; and receive a processing result including the device-detail information of the Internet-of-things device returned by the TCP/IP communication module.

Furthermore, the TCP/IP communication module may be configured to: receive and parse control instruction information sent by the control module via the remote router; send a parsed real device instruction to the CPU of the Internet-of-things device for execution; process a result of the execution by the CPU, and return the processed result of the execution to the remote router.

To sum up, the method, device and system provided by the disclosure are based on Internet-of-things technology; information is delivered using a TCP/IP package in a wired or wireless way; information on a control panel and a control logic of keys on the control panel of an Internet-of-things device is acquired by sending an instruction to inquire device-detail information to a TCP/IP communication module of the Internet-of-things device, then a virtual control panel is drawn on a screen of a UE according to the acquired information, and a control logic of keys is set to implement visualized, remote, and smart monitoring of the Internet-of-things device, so that operation by a user at a UE is as simple, clear, and easy as operation of a real Internet-of-things device, thereby reducing difficult in operation greatly.

DETAILED DESCRIPTION

According to various embodiments, a User Equipment (UE) acquires an Internet Protocol (IP) address of a required Internet-of-things device from a remote router, and acquires device-detail information of the Internet-of-things device corresponding to the IP address according to the acquired IP address; draws a virtual control panel of the Internet-of-things device according to the acquired device-detail information, and maps keys of the virtual control panel and a control logic of the keys of the virtual control panel; and monitors the Internet-of-things device remotely by operating the virtual control panel.

The disclosure is further elaborated below with reference to the drawings and specific embodiments.

Figure 1:
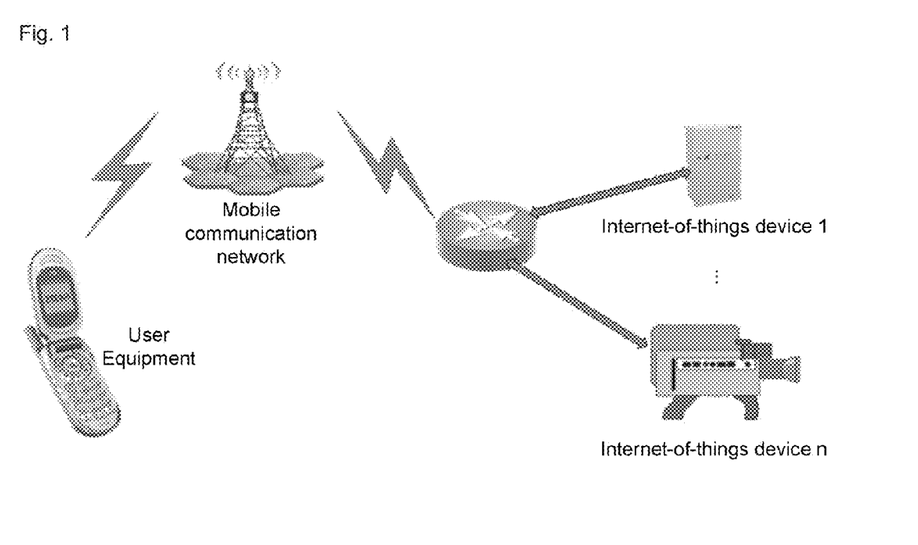
FIG. 1 is a structural diagram of composition of a network for monitoring an Internet-of-things device remotely.

FIG. 1 shows a structural diagram of composition of a network for monitoring an Internet-of-things device remotely in the disclosure. As shown in FIG. 1, a UE communicates with a remote mobile communication router (referred to as a remote router hereinafter) via a mobile communication network, and the remote router communicates with a respective TCP/IP communication module (not shown in FIG. 1) on each Internet-of-things device by way of wired or wireless access so as to ensure a smooth physical data link.

The UE is provided with a control module (not shown in FIG. 1). The control module is configured to acquire information on the IP address of a respective Internet-of-things device via the remote router, and send an instruction to inquire the device-detail information to a respective Internet-of-things device corresponding to the information on the IP address according to the acquired information on the IP address of the respective Internet-of-things device, so as to acquire device-detail information of the respective Internet-of-things device. The control module is further configured to draw and display a virtual control panel of the respective Internet-of-things device on a display screen of the UE according to the acquired device-detail information of the respective Internet-of-things device, and map a respective key of the virtual control panel and a control logic of the respective key of the virtual control panel. Thus, a user can implement visualized remote monitoring of the Internet-of-things device by operating the drawn virtual control panel.

Wherein, multiple Internet-of-things devices, which can be referred to as Internet-of-things devices 1 to n, are connected to the remote router, wherein n is the total number of the Internet-of-things devices and is a natural number.

Here, the UE may be a mobile phone, a computer and the like, and the communication network may be of a Global System of Mobile Communications (GSM), a General Packet Radio Service (GPRS), a Time Division-Synchronization Code Division Multiple Access (TDSCDMA), a Wideband Code Division Multiple Access (WCDMA) system, or the like.

Correspondingly, each Internet-of-things device is provided with a TCP/IP communication module configured to communicate with the control module interactively, to receive and analyze an instruction to inquire the device-detail information of the UE forwarded by the remote router, and to feed device-detail information of the Internet-of-things device back to the UE.

Figure 2:
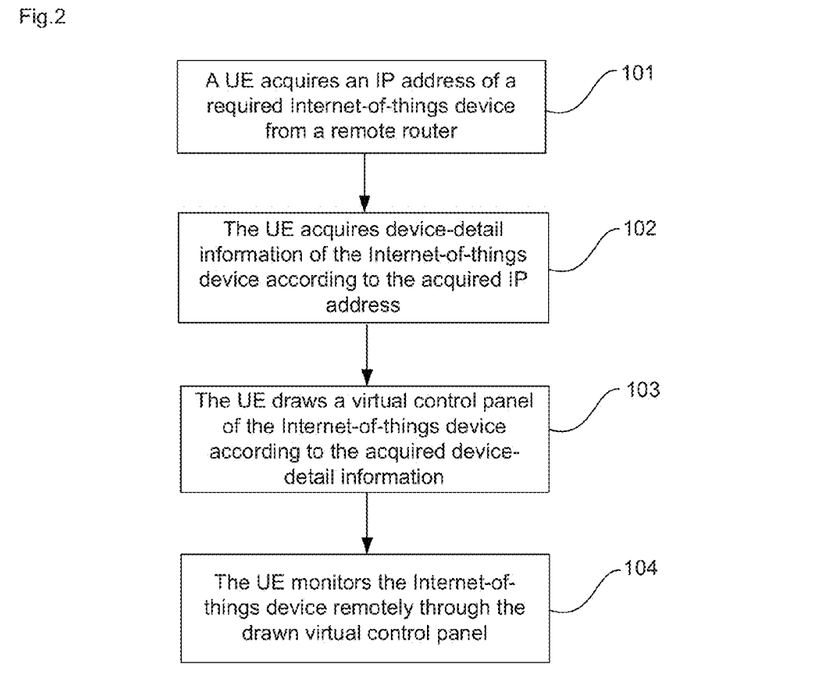
FIG. 2 is a flowchart of implementing a method for monitoring an Internet-of-things device remotely according to the disclosure.

FIG. 2 shows a flow of implementing a method for monitoring an Internet-of-things device remotely according to the disclosure. As shown in FIG. 2, specific implementing steps include:

Step 101: A UE acquires an IP address of a required Internet-of-things device from a remote router.

Specifically, the UE sends an instruction to acquire routing table information to the remote router; the remote router returns the routing table information of the remote router to the UE after receiving the instruction to acquire routing table information; and the UE parses out information on the IP address of the Internet-of-things device in the routing table information. In this way, the IP address of the required Internet-of-things device can be retrieved. Here, the UE can acquire the IP address of one or more Internet-of-things devices the UE needs to learn.

Step 102: The UE acquires device-detail information of the Internet-of-things device according to the acquired IP address.

Specifically, the UE sends an instruction to inquire the device-detail information to the Internet-of-things device corresponding to the IP address according to the acquired IP address of the Internet-of-things device, wherein the instruction to inquire the device-detail information is transmitted transparently to a TCP/IP communication module of the Internet-of-things device corresponding to the IP address via the remote router. After receiving the instruction to inquire the device-detail information, the TCP/IP communication module parses the instruction to inquire the device-detail information, and sends the parsed real device instruction to a CPU of the Internet-of-things device for execution. After executing a corresponding instruction, the CPU of the Internet-of-things device returns a result of the execution including device-detail information such as a device name, information on coordinates of a device control panel, a key control logic, and information on an instruction set back to the TCP/IP communication module. The TCP/IP communication module performs processing such as packing and the like on the result of the execution, and sends the processed result of the execution to the UE via the remote router. In this way, device-detail information of an Internet-of-things device corresponding to the IP address can be acquired. The above is a process of acquiring device-detail information of an Internet-of-things device, and device-detail information of each Internet-of-things device can be acquired using an identical flow.

Step 103: The UE draws a virtual control panel of the Internet-of-things device according to the acquired device-detail information.

Specifically, the UE draws a virtual control panel of a corresponding Internet-of-things device on a display screen of the UE according to device-detail information returned by the remote router, and maps keys of the virtual control panel and a control logic of the keys of the virtual control panel, namely, binds the control logic of the keys on the virtual control panel to the keys of the virtual control panel. In this way, a virtual control panel of an Internet-of-things device can be drawn.

Step 104: The UE monitors the Internet-of-things device remotely through the drawn virtual control panel.

Specifically, through a key-press or touch operation of the virtual control panel displayed on the screen of the UE, the control logic of the keys of the virtual control panel is triggered to generate instruction information, wherein the generated instruction information is sent to the TCP/IP communication module of the Internet-of-things device via the remote router. After receiving instruction information, the TCP/IP communication module parses the instruction information, extracts a parsed real device instruction and sends the parsed real device instruction to the CPU of the Internet-of-things device for execution. After the CPU of the Internet-of-things device performs an operation indicated by the UE, and no matter the operation succeeds or fails, the CPU of the Internet-of-things device will send return information to the UE for further confirmation. So far visualized remote monitoring of an Internet-of-things device can be implemented using the method of the present disclosure.

In order to implement the aforementioned method, the disclosure further provides a device for monitoring an Internet-of-things device remotely, which includes a control module and a TCP/IP communication module.

The control module further includes an IP address retrieving unit, a detail information acquiring unit, a virtual mapping unit and a remote monitoring unit.

The IP address retrieving unit is configured to acquire an IP address of a required Internet-of-things device from a remote router.

Specifically, the IP address retrieving unit is configured to send an instruction to acquire routing table information to the remote router, and receive routing table information returned by the remote router, wherein the routing table information includes information on the IP address of the required Internet-of-things device.

The detail information acquiring unit is configured to acquire device-detail information of the Internet-of-things device corresponding to the IP address according to the acquired IP address.

Specifically, the detail information acquiring unit is configured to: send an instruction to inquire the device-detail information to the TCP/IP communication module of an Internet-of-things device corresponding to the IP address according to the acquired IP address; and receive a processing result including the device-detail information of the Internet-of-things device returned by the TCP/IP communication module.

The virtual mapping unit is configured to draw a virtual control panel of the Internet-of-things device according to the acquired device-detail information, and map keys of the virtual control panel and a control logic of the keys of the virtual control panel.

The remote monitoring unit is configured to monitor the Internet-of-things device remotely through the drawn virtual control panel.

The TCP/IP communication module is configured to implement interactive communication between a CPU of the Internet-of-things device and the remote router.

Specifically, the TCP/IP communication module is further configured to: receive and parse control instruction information sent by the control module via the remote router; send a parsed real device instruction to the CPU of the Internet-of-things device for execution; process a result of the execution by the CPU, and return the processed result of the execution to the remote router.

Preferably, the control module is arranged in a UE, and the TCP/IP communication module is arranged in an Internet-of-things device.

The disclosure further provides a system for monitoring an Internet-of-things device remotely. The system includes a UE, a remote router and an Internet-of-things device.

The UE includes a control module. The control module further includes an IP address retrieving unit, a detail information acquiring unit, a virtual mapping unit and a remote monitoring unit.

The IP address retrieving unit is configured to acquire an IP address of a required Internet-of-things device from the remote router.

Specifically, the IP address retrieving unit is configured to send an instruction to acquire routing table information to the remote router, and receive routing table information returned by the remote router, wherein the routing table information includes information on the IP address of the required Internet-of-things device.

The detail information acquiring unit is configured to acquire device-detail information of the Internet-of-things device corresponding to the IP address according to the acquired IP address.

Specifically, the detail information acquiring unit is configured to: send an instruction to inquire the device-detail information to the TCP/IP communication module of an Internet-of-things device corresponding to the IP address according to the acquired IP address; and receive a processing result including the device-detail information of the Internet-of-things device returned by the TCP/IP communication module.

The virtual mapping unit is configured to draw a virtual control panel of the Internet-of-things device according to the acquired device-detail information, and map keys of the virtual control panel and a control logic of the keys of the virtual control panel.

The remote monitoring unit is configured to monitor the Internet-of-things device remotely through the drawn virtual control panel.

The Internet-of-things device includes a TCP/IP communication module configured to implement interactive communication between a CPU of the Internet-of-things device and the remote router.

Specifically, the TCP/IP communication module is further configured to: receive and parse control instruction information sent by the control module via the remote router; send a parsed real device instruction to the CPU of the Internet-of-things device for execution; and return a result of the execution by the CPU to the remote router.

An embodiment of a system for monitoring an Internet-of-things device remotely of the disclosure and a workflow thereof are elaborated below with reference to FIG. 3 and FIG. 4.

Figure 3:
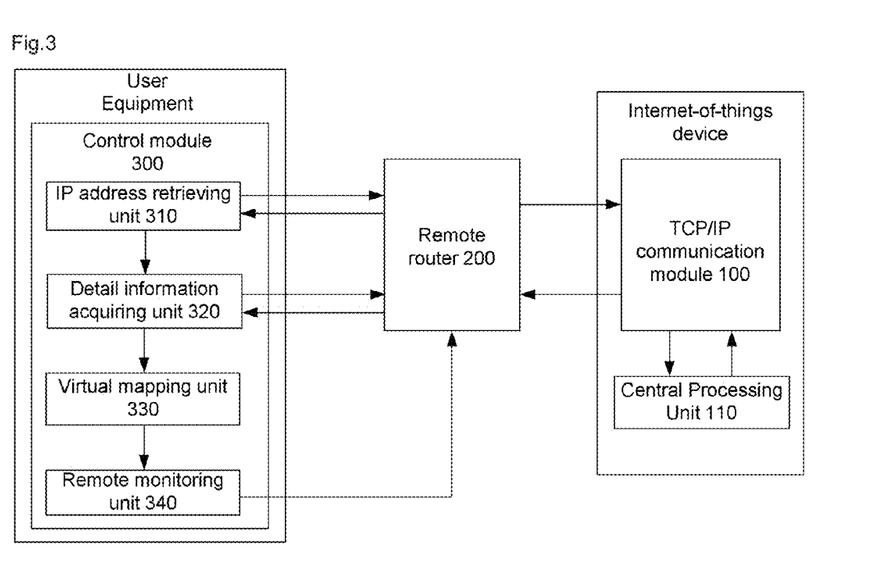
FIG. 3 is a structural diagram of composition of an embodiment of a system for monitoring an Internet-of-things device remotely according to the disclosure.

FIG. 3 shows a structural diagram of composition of an embodiment of a system for monitoring an Internet-of-things device remotely according to the disclosure. As shown in FIG. 3, the system includes a UE, a remote router 200 and a target Internet-of-things device. In the system, the UE includes a control module 300 which is mainly used to control an Internet-of-things device, analyze and process information fed back by the remote router 200 and an Internet-of-things device; the remote router 200 serves mainly as a link between the UE and an Internet-of-things device; and an Internet-of-things device includes a TCP/IP communication module 100 and a CPU 110.

The TCP/IP communication module 100 is mainly used to: implement interactive communication between the CPU 110 of the Internet-of-things device and the remote router 200; receive and parse an instruction such as an instruction to inquire the device-detail information, a control instruction of the Internet-of-things device sent by the control module 300 of the UE via the remote router 200; receive and process a result returned by the CPU 110 of the execution of parsed instruction information, and return a processed result of the execution to the remote router 200. The CPU 110 is mainly used to execute an instruction sent by the control module 300 and parsed by the TCP/IP communication module 100, and return a result of the execution to the TCP/IP communication module 100.

Furthermore, the control module 300 includes an IP address retrieving unit 310, a detail information acquiring unit 320, a virtual mapping unit 330 and a remote monitoring unit 340.

The IP address retrieving unit 310 is configured to acquire an IP address of a required Internet-of-things device from the remote router 200 such that the IP address of the Internet-of-things device is retrieved.

Specifically, the IP address retrieving unit 310 is configured to send an instruction to acquire routing table information to the remote router 200, and receive routing table information returned by the remote router 200, wherein the routing table information includes information on the IP address of the required Internet-of-things device.

The detail information acquiring unit 320 is configured to acquire device-detail information of the Internet-of-things device corresponding to the IP address according to the acquired IP address, so as to acquire device-detail information of the Internet-of-things device.

Specifically, the detail information acquiring unit 320 is configured to: send an instruction to inquire the device-detail information to the TCP/IP communication module 100 of an Internet-of-things device corresponding to the IP address according to the acquired IP address; and receive a processing result including the device-detail information of the Internet-of-things device returned by the TCP/IP communication module 100.

The virtual mapping unit 330 is configured to draw a virtual control panel of the Internet-of-things device according to the acquired device-detail information, and map keys of the virtual control panel and a control logic of the keys of the virtual control panel.

The remote monitoring unit 340 is configured to monitor the Internet-of-things device remotely through the drawn virtual control panel, so as to implement visualized, smart and remote control of an Internet-of-things device.

Figure 4:
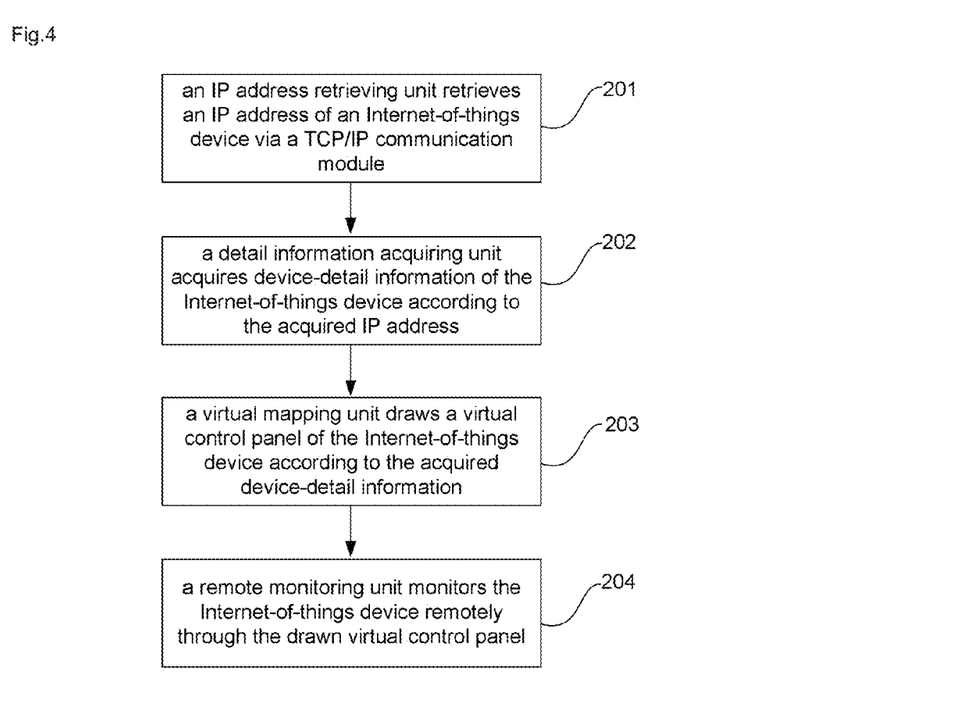
FIG. 4 is a schematic diagram of a workflow of the system shown in FIG. 3.

FIG. 4 shows a workflow of the system shown in FIG. 3. The workflow specifically includes the following steps:

Step 201: an IP address retrieving unit 310 retrieves an IP address of an Internet-of-things device via a TCP/IP communication module 100.

Specifically, after the system completes an initialization operation, the IP address retrieving unit 310 in the control module 300 of the UE sends a request for acquiring routing table information of the remote router 200 to the remote router 200, so as to acquire information on the IP address of a respective Internet-of-things device;

the remote router 200 prepares the routing table information, and returns the routing table information including the information on the IP address of each Internet-of-things device to the IP address retrieving unit 310; and the IP address retrieving unit 310 receives and stores the routing table information returned by the remote router 200, parses the routing table information, and acquires the information on the IP address of each Internet-of-things device.

Step 202: a detail information acquiring unit 320 acquires device-detail information of the Internet-of-things device according to the acquired IP address.

Specifically, the detail information acquiring unit 320 sends an inquiring instruction to inquire a device name, a coordinate of a device control panel, a key control logic, information on an instruction set and the like respectively to an Internet-of-things device via the remote router 200 according to the information on the IP address of each Internet-of-things device acquired by the IP address retrieving unit 310;

A TCP/IP communication modules 100 on an Internet-of-things device respectively parse the inquiring instruction sent by the detail information acquiring unit 320 via the remote router 200, extract the inquiring instruction and send the extracted inquiring instruction to CPU 110 of the respective Internet-of-things device for execution, and after executing the inquiring instruction, the CPU 110 returns device-detail information such as a device name, coordinates of a device control panel, a key control logic, and information on an instruction set of the respective Internet-of-things device to the TCP/IP communication module 100; and the TCP/IP communication module 100 receives and packs the device-detail information returned by the CPU 110 of the respective Internet-of-things device, and return the packed device-detail information to the detail information acquiring unit 320 of the UE via the remote router 200.

Step 203: a virtual mapping unit 330 draws a virtual control panel of the Internet-of-things device according to the acquired device-detail information.

Specifically, the virtual mapping unit 330 draws a list of various Internet-of-things devices on a screen of the UE according to the device-detail information of an Internet-of-things device acquired by the detail information acquiring unit 320. For example, a list of various Internet-of-things devices is drawn on a screen of a mobile phone or a screen of a computer, the drawn list of devices is displayed after expiration of a period, and memory is allocated for each Internet-of-things device in the list of devices, for storing information such as a device name, information on coordinates of a device control panel, a key control logic, information on an instruction set and the like of the each Internet-of-things device;

A specific device is selected from the drawn list of devices in turn, and a virtual control panel of each Internet-of-things device is drawn on the screen of the UE according to the stored information such as a device name, information on coordinates of a device control panel, a key control logic, information on an instruction set and the like; and A corresponding key is mapped on the drawn virtual control panel of each Internet-of-things device, and a control logic is mapped for a corresponding key.

Note that a specific way to draw a virtual control panel of an Internet-of-things device according to the stored information such as a device name, information on coordinates of a device control panel, a key control logic, information on an instruction set and the like of a respective Internet-of-things device, as well as a specific way to map keys of a virtual control panel and a control logic of the keys of the virtual control panel may be a conventional technical means used by those skilled in the art, and is not described here repeatedly.

Step 204: a remote monitoring unit 340 monitors the Internet-of-things device remotely through the drawn virtual control panel.

Specifically, the remote monitoring unit 340 sends a remote monitoring instruction to an Internet-of-things device through a display screen or keyboard of the UE, a client application of the UE executes the aforementioned control logic of the keys of the device, generates a Protocol Data Unit (PDU) of a specific format using a specific instruction obtained after executing the control logic, adds user data portion of an IP package to the PDU, and then sends the PDU to the TCP/IP communication module 100 of the Internet-of-things device. If the Internet-of-things device is a video device, then the UE starts a video player of the UE itself, opens a port and prepares to receive a video data flow returned by the video device;

after receiving and parsing the PDU sent by the remote monitoring unit 340, the TCP/IP communication module 100 on the Internet-of-things device sends a real device instruction generated by the parsing to the CPU 110 of the Internet-of-things device; and the CPU 110 executes a corresponding operation according to the real device instruction, and returns information on a result of the execution to the TCP/IP communication module 100 no matter the operation succeeds or fails;

the TCP/IP communication module 100 processes (packs, for example) information on the result of the execution by CPU 110 of the Internet-of-things device, and transmits transparently the processed result of the execution to the UE via the remote router 200; and the UE parses the received data package, and displays the information on the result of the execution of the Internet-of-things device in a user language, so as to facilitate friendly man-machine interaction. For example, assume that the Internet-of-things device is a smart air conditioner on which a refrigerating operation is performed. If the operation succeeds, then 'the smart air conditioner successfully activates a refrigerating operation' will be displayed on the screen of the UE. If the Internet-of-things device is a video device, then the UE sends the parsed data to a data receiving port of a video player, and the video player implements real-time video play after performing encoding and decoding operations.

The above are only preferable embodiments of the disclosure, and are not intended to limit the scope of the disclosure. Likewise, any solution having the aforementioned features and equivalent structural variation made using content of the description and drawings of the disclosure shall fall within the scope of protection of the disclosure.

The invention claimed is:

1. A method for monitoring an Internet-of-things device remotely, comprising:

acquiring, by a User Equipment (UE), an Internet Protocol (IP) address of an Internet-of-things device from a remote router, and acquiring, by the UE, device-detail information of the Internet-of-things device corresponding to the IP address according to the acquired IP address;

drawing, by the UE, a virtual control panel of the Internet-of-things device according to the acquired device-detail information, and mapping, by the UE, keys of the virtual control panel and a control logic of the keys of the virtual control panel; and monitoring, by the UE, the Internet-of-things device remotely by operating the virtual control panel.

2. The method according to claim 1, wherein the step of acquiring, by a UE, an IP address of an Internet-of-things device from a remote router comprises:

sending, by the UE, an instruction to acquire routing table information to the remote router, receiving, by the UE, the routing table information of the remote router returned by the remote router; and parsing out, by the UE, information on the IP address of the Internet-of-things device in a routing table.

3. The method according to claim 2, wherein the device-detail information of the Internet-of-things device comprises: a device name, information on coordinates of a device control panel, a key control logic, and information on an instruction set.

4. The method according to claim 1, wherein the step of acquiring, by the UE, device-detail information of the Internet-of-things device corresponding to the IP address according to the acquired IP address comprises:
sending, by the UE, an instruction to inquire the device-detail information to a Transmission Control Protocol (TCP)/IP communication module of the Internet-of-things device corresponding to the IP address according to the acquired IP address of the Internet-of-things device, so that the TCP/IP communication module parses and extracts the instruction to inquire the device-detail information, and sends the parsed real device instruction to a Central Processing Unit (CPU) of the Internet-of-things device, which CPU then executes the parsed real device instruction; and receiving, by the UE, a result of the execution packed by the TCP/IP communication module and then returned by the TCP/IP communication module via the remote router.

5. The method according to claim 4, wherein the device-detail information of the Internet-of-things device comprises: a device name, information on coordinates of a device control panel, a key control logic, and information on an instruction set.

6. The method according to claim 1, wherein the device-detail information of the Internet-of-things device comprises: a device name, information on coordinates of a device control panel, a key control logic, and information on an instruction set.

7. The method according to claim 1, wherein the step of monitoring, by the UE, the Internet-of-things device remotely by operating the virtual control panel comprises:
performing, by the UE, a key operation of the virtual control panel, and sending, by the UE, instruction information generated by the control logic of the keys of the virtual control panel to a TCP/IP communication module of the Internet-of-things device via the remote router, so that the TCP/IP communication module receives and parses the instruction information, and delivers a real device instruction generated from parsing the instruction information to a CPU of the Internet-of-things device, which CPU then executes an operation corresponding to the real device instruction; and receiving, by the UE, information on a result of the execution sent by the CPU.

8. A device for monitoring an Internet-of-things device remotely, comprising a control module, a display, and a Transmission Control Protocol (TCP)/Internet Protocol (IP) communication module, wherein
the control module comprises an IP address retrieving unit, a detail information acquiring unit, a virtual mapping unit and a remote monitoring unit, wherein
the IP address retrieving unit is configured to acquire an IP address of a required Internet-of-things device from a remote router;
the detail information acquiring unit is configured to acquire device-detail information of the Internet-of-things device corresponding to the IP address according to the acquired IP address;
the virtual mapping unit is configured to draw and display a virtual control panel of the Internet-of-things device on the display according to the acquired device-detail information, and map keys of the virtual control panel and a control logic of the keys of the virtual control panel; and
the remote monitoring unit is configured to monitor the Internet-of-things device remotely through the drawn virtual control panel; and
the display is configured to display the virtual control panel of the Internet-of-things device,
the TCP/IP communication module is configured to implement interactive communication between a Central Processing Unit (CPU) of the Internet-of-things device and the remote router,
wherein the device further comprises a processor and a memory storing the control module.

9. The device according to claim 8, wherein the detail information acquiring unit is configured to: send an instruction to inquire the device-detail information to the TCP/IP communication module of an Internet-of-things device corresponding to the IP address according to the acquired IP address; and receive a processing result including the device-detail information of the Internet-of-things device returned by the TCP/IP communication module.

10. The device according to claim 9, wherein the TCP/IP communication module is configured to: receive and parse control instruction information sent by the control module via the remote router; send a parsed real device instruction to the CPU of the Internet-of-things device for execution; process a result of the execution by the CPU, and return the processed result of the execution to the remote router.

11. The device according to claim 8, wherein the IP address retrieving unit is configured to send an instruction to acquire routing table information to the remote router, and receive routing table information returned by the remote router, wherein the routing table information includes information on the IP address of the required Internet-of-things device.

12. The device according to claim 8 wherein the TCP/IP communication module is configured to: receive and parse control instruction information sent by the control module via the remote router; send a parsed real device instruction to the CPU of the Internet-of-things device for execution; process a result of the execution by the CPU, and return the processed result of the execution to the remote router.

13. A system for monitoring an Internet-of-things device remotely, comprising a User Equipment (UE), a remote router and an Internet-of-things device, wherein
the UE comprises a control module, wherein the control module comprises an Internet Protocol (IP) address retrieving unit, a detail information acquiring unit, a virtual mapping unit and a remote monitoring unit, wherein
the IP address retrieving unit is configured to acquire an IP address of a required Internet-of-things device from the remote router;
the detail information acquiring unit is configured to acquire device-detail information of the Internet-of-things device corresponding to the IP address according to the acquired IP address;
the virtual mapping unit is configured to draw a virtual control panel of the Internet-of-things device according to the acquired device-detail information, and map keys of the virtual control panel and a control logic of the keys of the virtual control panel; and the remote monitoring unit is configured to monitor the Internet-of-things device remotely through the drawn virtual control panel; and the Internet-of-things device comprises a Transmission Control Protocol (TCP)/IP communication module configured to implement interactive communication between a Central Processing Unit (CPU) of the Internet-of-things device and the remote router.

14. The system according to claim 13, wherein the detail information acquiring unit is configured to: send an instruction to inquire the device-detail information to the TCP/IP communication module of an Internet-of-things device corresponding to the IP address according to the acquired IP address; and receive a processing result including the device-detail information of the Internet-of-things device returned by the TCP/IP communication module.

15. The system according to claim 14, wherein the TCP/IP communication module is configured to: receive and parse control instruction information sent by the control module via the remote router; send a parsed real device instruction to the CPU of the Internet-of-things device for execution; process a result of the execution by the CPU, and return the processed result of the execution to the remote router.

16. The system according to claim 13, wherein the IP address retrieving unit is configured to send an instruction to acquire routing table information to the remote router, and receive routing table information returned by the remote router, wherein the routing table information includes information on the IP address of the required Internet-of-things device.

17. The system according to claim 13, wherein the TCP/IP communication module is configured to: receive and parse control instruction information sent by the control module via the remote router; send a parsed real device instruction to the CPU of the Internet-of-things device for execution; process a result of the execution by the CPU, and return the processed result of the execution to the remote router.

* * * * *